United States Patent
Thorsson et al.

(10) Patent No.: US 12,340,492 B2
(45) Date of Patent: Jun. 24, 2025

(54) SCREEN-SHARING CONFIRMATION FOR ONLINE MEETINGS

(71) Applicant: Telefonaktiebolaget LM Ericsson (publ), Stockholm (SE)

(72) Inventors: Sara Thorsson, Stockholm (SE); Tommy Arngren, Södra Sunderbyn (SE); Peter Ökvist, Luleå (SE); Gunilla Berndtsson, Nacka (SE); Andreas Kristensson, Södra Sandby (SE); David Lindero, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 342 days.

(21) Appl. No.: 18/017,498

(22) PCT Filed: Jul. 24, 2020

(86) PCT No.: PCT/EP2020/070909
§ 371 (c)(1),
(2) Date: Jan. 23, 2023

(87) PCT Pub. No.: WO2022/017619
PCT Pub. Date: Jan. 27, 2022

(65) Prior Publication Data
US 2023/0281778 A1 Sep. 7, 2023

(51) Int. Cl.
*G06T 7/00* (2017.01)
*H04L 65/403* (2022.01)

(52) U.S. Cl.
CPC .. *G06T 7/0002* (2013.01); *G06T 2207/10016* (2013.01); *G06T 2207/30168* (2013.01); *H04L 65/403* (2013.01)

(58) Field of Classification Search
CPC ......... G06T 7/0002; G06T 2207/10016; G06T 2207/30168; H04L 65/403; G06Q 10/1095; G06Q 10/10
See application file for complete search history.

(56) References Cited

U.S. PATENT DOCUMENTS

2006/0136828 A1* 6/2006 Asano ................... G06F 3/1454
715/764
2015/0281299 A1 10/2015 Moustafa et al.
(Continued)

OTHER PUBLICATIONS

International Search Report and Written Opinion of the International Searching Authority, PCT/EP2020/070909, mailed Feb. 8, 2021, 9 pages.
(Continued)

*Primary Examiner* — Phung-Hoang J Nguyen
(74) *Attorney, Agent, or Firm* — Sage Patent Group

(57) ABSTRACT

A method is provided which is performed by an online meeting application executed by an electronic device. The method includes, during an ongoing online meeting while the electronic device is operative in a perester mode, sending a first presentation stream to participant devices. The method receives a presentation quality metric from each of the participant device, where the presentation quality metric indicates how the first presentation stream is played out through the participant device. The method then displays an indication of the presentation quality metric on a display device for review by a user of the electronic device. Related electronic devices are disclosed.

18 Claims, 6 Drawing Sheets

(56) References Cited

U.S. PATENT DOCUMENTS

2017/0070702 A1\* 3/2017 Rosenberg ............. H04N 7/147
2020/0076862 A1\* 3/2020 Eliason ............... G06F 3/04897
2021/0037070 A1\* 2/2021 Arai ........................ H04L 67/08

OTHER PUBLICATIONS

Leblanc, B., et al., "Announcing Windows 10 Insider Preview Build 17704," Jun. 27, 2018, <https://blogs.windows.com/windows-insider/2018/06/27/announcing-windows-10-insider-preview-build-17704/> (XP055769735) 31 pages.

\* cited by examiner

SCREEN-SHARING CONFIRMATION FOR ONLINE MEETINGS

CROSS REFERENCE TO RELATED APPLICATIONS

This application is a 35 U.S.C. § 371 national stage application of PCT International Application No. PCT/EP2020/070909 filed on Jul. 24, 2020, the disclosure and content of which is incorporated by reference herein in its entirety.

FIELD

The present disclosure relates to sharing video and/or audio streams between electronic devices during online meetings.

BACKGROUND

There are a number of platforms for online collaboration and video meetings (for example, Microsoft Teams, Skype, Zoom, etc.). One common feature for the different platforms is the ability for a presenter to share their display screen, application window, or documents with participant devices during an online meeting. During online meetings a presenter will oftentimes ask meeting attendees whether a presentation is viewable by the attendees. These one-time or occasional checks interrupt the meeting flow and can lead to confusion when a large number of participants attempt to nearly simultaneously respond.

SUMMARY

Some embodiments of the present disclosure are directed to a method performed by an online meeting application executed by an electronic device. The method includes sending a first presentation stream to participant devices during an ongoing online meeting while the electronic device is operative in a presenter mode. The method further includes receiving a presentation quality metric from each of the participant devices. The presentation quality metric indicates how the first presentation stream is played out through the participant device. The method further includes displaying an indication of the presentation quality metric on a display device for review by a user of the electronic device.

Some other related embodiments of the present disclosure directed to an electronic device including communication interface, at least one processor connected to a display device into the communication interface, at least one memory. The at least one memory includes online meeting application program code executable by the at least one processor to, during an ongoing online meeting while the electronic device is operative as a first presenter device that is sending a first presentation stream through the communication interface to participant devices: receive a presentation quality metric from the participant devices, wherein the presentation quality metric indicates how the first presentation stream is played out through the participant device; and display an indication of the presentation quality metric on the display device for review by a user of the electronic device.

Potential advantages that can be provided by these and other embodiments include that the presenter can be provided frequent or continuous feedback on how each of the participant devices are playing out the presentation stream from the presenter device. Moreover, the feedback can inform the presenter not just whether the presentation stream is being played out through the participant devices but moreover how the presentation stream is being perceived by participants. The feedback can enable a presenter to adjust timing of the audio discussion accompanying a video stream component to compensate for participants' delayed or problematic receipt of the video stream component and/or adjust the video stream component, e.g., zoom-in to enlarge key graphical content, to facilitate participants' readability of content of the video stream component on various types (e.g., small displays) of participant devices.

The presentation quality metrics received from the participant devices may indicate when a participant device begins displaying a video stream component of the presentation stream. The receive presentation quality metrics may alternatively or additionally indicate any one or more of: screen size of a display device used by the participant device to playout the video stream component; screen resolution of a display device used by the participant device to playout the video stream component; and type of the participant device from a list of types that includes at least two of a smart phone, a table computer, a laptop computer, a desktop computer, and a vehicle entertainment system. The receive presentation quality metrics may alternatively or additionally indicate any one or more of: characteristics of video stream components which are received and/or that are played out through the participant devices; whether a display device is presently used by the participant device to playout a video stream component of the first presentation stream; whether an on-board speaker of the participant device is presently used for playout of an audio stream component of the first presentation stream; whether a separate speaker connected to the participant device is presently used for playout of an audio stream component of the first presentation stream; whether a headset connected to the participant device is presently used for playout of an audio stream component of the first presentation stream; and whether a noise cancellation headset connected to the participant device is presently used for playout of an audio stream component of the first presentation stream.

Other related methods and electronic devices according to embodiments will be or become apparent to one with skill in the art upon review of the following drawings and detailed description. It is intended that all such additional methods and electronic devices be included within this description and protected by the accompanying claims.

BRIEF DESCRIPTION OF THE DRAWINGS

The accompanying drawings, which are included to provide a further understanding of the disclosure and are incorporated in a constitute a part of this application, illustrate certain non-limiting embodiments of inventive concepts. In the drawings.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present or used in another embodiment.

Various embodiments of the present disclosure enable a presenter to receive feedback metrics indicating how a presentation stream is being playing out through participant devices. The presenter can monitor what is indicated by the feedback metrics during the ongoing online meeting rather than needing to pause the presentation in order to ask participants whether they can view the presentation and/or whether content of the presentation is readable. Various operations that can be performed by presenter devices and participant devices and related potential advantages thereof are described in further detail below.

Figure 1:
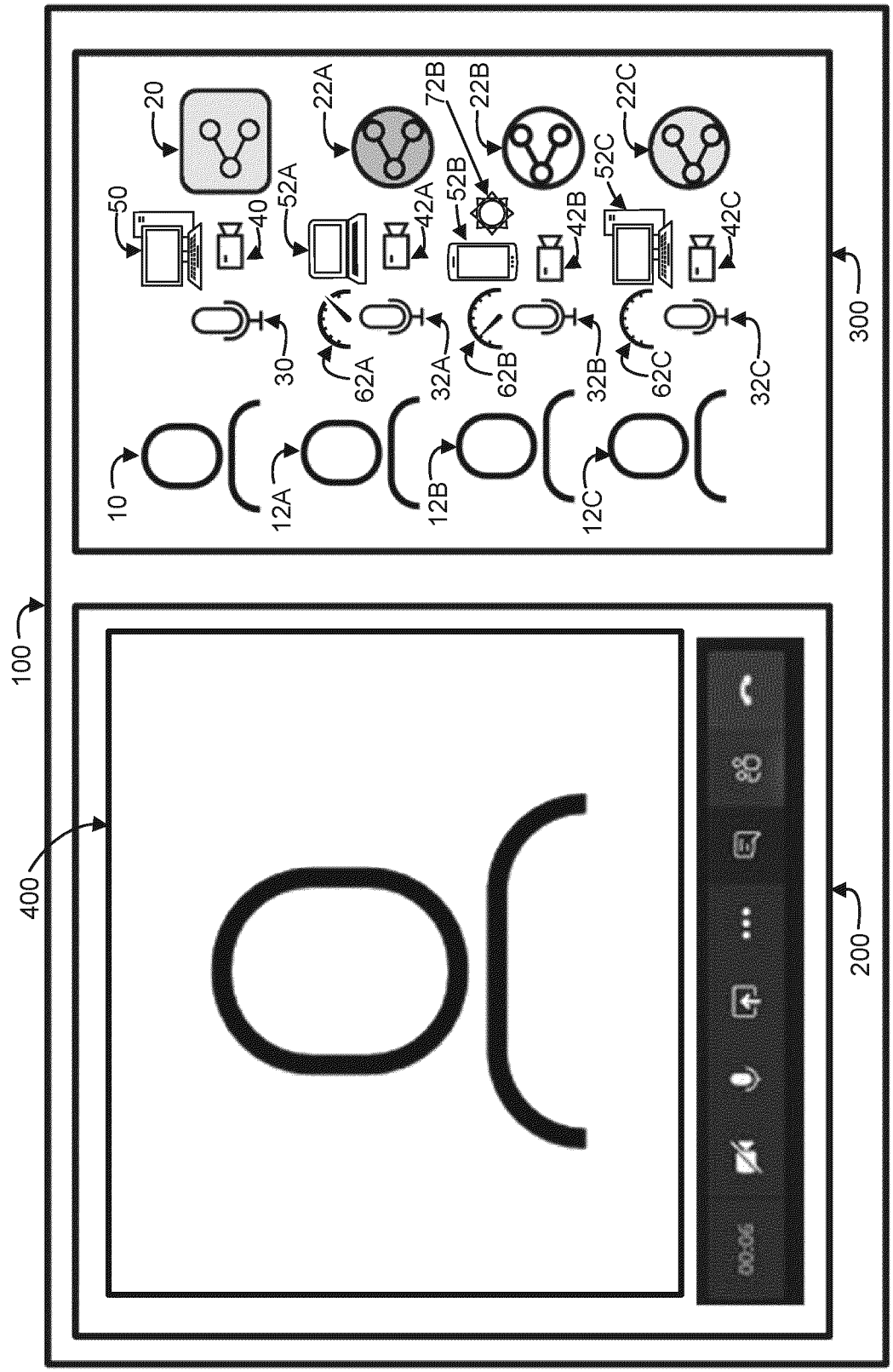
FIG. 1 illustrates a window that may be displayed by an online meeting application on a display device of an electronic device during an online meeting according to some embodiments of the present disclosure.

FIG. 1 illustrates a window 100 that may be displayed by an online meeting application on a display device of an electronic device during an online meeting according to some embodiments. During an online meeting a presenter operating a presentation electronic device can share a display screen, application window, or documents with participants operating participant electronic devices. The electronic devices may include, but is not limited to, a smart phone, a tablet computer, a laptop computer, a desktop computer, a vehicle entertainment system, etc.

When an electronic device is sending a presentation stream, e.g., video component and/or audio component, to another electronic device, the electronic device is referred to as a presenter device (operating in a presenter mode) and the other electronic devices receiving the presentation stream are referred to as participant devices (operating in a participant mode).

In some embodiments of the present disclosure, an online meeting application executed by an electronic device operating in presenter mode, is configured to send a presentation stream to participant devices during an ongoing online meeting while the electronic device is operative in a presenter mode. The presenter device receives a presentation quality metric from each of the participant devices. The presentation quality metric indicates how the first presentation stream is played out through the participant device. The presenter device displays an indication of the presentation quality metric on a display device for review by a user of the electronic device.

Referring to FIG. 1, the window 100 corresponds to example illustrative indications of the presentation quality metrics that may be displayed on a display device of a presenter device operating in a presenter mode. A presenter device may display some or all of the information shown in window 100 or may display other information as described below with reference to FIGS. 1 and 2.

In some embodiments, the window 100 may correspond to an entirety of what is being displayed by the on line meeting application on the display device, and include a first sub-window 200 and a second sub-window 300. The first sub-window 200 includes a share window 400 that can display a video stream component that is being streamed from the presenter device for the online meeting when the electronic device is operating in a presenter mode, or can display a video stream component being received from another electronic device during the online meeting while the electronic device is operating in a participant mode.

While operating as a presenter device, the second sub-window 300 displays textual and/or graphical indications of the presentation quality metrics received from participant devices for review by a user of the presenter device. The second sub-window 300 may include a presenter icon 10 and participant icons 12A-C that indicate the participation, presence, registration, and/or involvement in the online meeting of corresponding participant devices (e.g., three participant devices respectively corresponding to participant icons 12A-C). Additionally, the presenter icon 10 and participant icons 12A-C may include an image(s), character(s), or other representations that show the likeness or name of the respective user who is using the respective presenter/participant device.

For example, the presenter icon 10 may include an image of a user who is using the presenter device, or the presenter icon 10 may include a name, initials of a name, or a few letters of a name of the user who is using the presenter device. The participant icons 12A-C may include an image of a user who is using each respective participant device, or the participant icons 12A-C may include a name, initials of the name, or a few letters of the name of the user who is using each respective participant device.

The second sub-window 300 may display a presenter connection icon 20 and participant connection icons 22A-C. The presenter connection icon 20 may indicate at least one of: status of the communication connection between the presenter device and an online meeting server and/or the participant devices and/or a quality of service metric for the communication connection between the presenter device and the online meeting server and/or the participant devices. Each participant connection icon 22A-C may indicate at least one of: a communication connection between each respective participant device and the presenter device, a quality of service metric for the communication connection between each respective participant device and the presenter device, and a quality metric at which a presentation stream from the presenter device is received by each respective participant device. Different metric values indicated for the presenter connection icon 20 and the participant connection icons 22A-C may be illustrated by color variations, numeric indications, and/or differing icon shapes or indicia.

For example, when the quality of service metric for participant icon 12C is above a preferred threshold, then the participant connection icon 22C may be colored green. In contrast when the quality of service metric level for participant icon 12A is below an unacceptable threshold, then the participant connection icon 22A may be colored red.

The second sub-window 300 may further display a presenter audio icon 30 and participant audio icons 32A-C. The presenter audio icon 30 may indicate whether the presenter device's audio is muted and/or may indicate an audio level that the audio is being transmitted at for the participant devices. The participant audio icons 32A-C may indicate at least one of: whether the participant device has muted a participant device microphone; whether an on-board speaker of the participant device is presently used for playout of an audio stream component of a presentation stream transmitted from the presenter device to the participant device; whether a separate speaker connected to the participant device is presently used for playout of an audio stream component of a presentation stream transmitted from the presenter device to the participant device; whether a headset connected to the participant device is presently used for playout of an audio stream component of a presentation stream transmitted from the presenter device to the participant device; whether a noise cancellation headset connected to the participant device is presently used for playout of an audio stream component of a presentation stream transmitted from the presenter device to the participant device; and an audio level that the participant device is playing the transmitted audio at. The audio icon indications may be indicated for the presenter device and each participant device through colors, numeric indications, or shapes of the respective icons.

The second sub-window 300 may display a presenter video icon 40 and participant video icons 42A-C. The presenter video icon 40 may indicate at least one of: whether the video is being transmitted to participant devices and a quality of video being transmitted. The participant video icon 42A-C may indicate at least one of: whether a display device is presently used by a participant device to playout a video stream component of the first presentation stream, whether the video has been stopped by the participant device, a time lag between sending of a video frame of the presentation stream by the presenter device to display of the video frame by the participant device, and a quality of video being played out of a display device of the presenter device. The presenter video icon 40 and participant video icons 42A-C may indicate these features through colors, numeric indications, or shapes of the respective icons.

Additionally or alternatively, the participant video icons 42A-C may further indicate when the respective participant device begins displaying a video stream component comprised in a video stream that is shared from the presenter device to the respective participant device.

The second sub-window 300 may display a presenter device icon 50 and participant device icons 52A-C. The presenter device icon 50 may indicate the type of the presenter device from a list of types that includes at least two of a smart phone, a laptop computer, a desktop computer, and a vehicle entertainment system. In an example, the presenter device of the presenter icon 10 may be a desktop computer, so the presenter device icon 50 may have an image or shape that visually indicates a desktop computer.

The participant device icons 52A-C may display at least one of: screen size of a display device used by the participant device to playout the video stream component; screen resolution of a display device used by the participant device to playout the video stream component; and type of the participant device from a list of types that includes at least two of a smart phone, a laptop computer, a desktop computer, and a vehicle entertainment system. A presenter may thereby dynamically determine from the device icons 52A-C whether during a portion of the presentation the shared video component should be zoomed-in on a particular display area to facilitate readability by a participant who is using a smart phone with a relatively small display device.

The second sub-window 300 may display participant ambient noise icons 62A-C that indicate an ambient noise level measured by the participant device and/or a presence of ambient noise. A presenter may thereby dynamically determine from the ambient noise icons 62A-C whether during the presentation the presenter should speak more loudly and/or with a slower cadence to improve understandability by a participant who is being subjected to high ambient noise levels.

The second sub-window 300 may display an ambient light icon 72B that indicates an ambient light level measured by the participant device and/or a presence of ambient light. A presenter may thereby dynamically determine from the ambient light icon 72B whether during the presentation the presenter should adjust contrast of the shared video and/or zoom-in on a display area to facilitate readability by a participant who is viewing the presentation while subjected to high ambient light, e.g., direct sunshine.

While a presenter ambient noise icon and presenter ambient light icon is not shown in FIG. 1, it should be understood that an ambient noise icon and/or ambient light icon may be displayed to indicate in the second sub-window 300 a level of ambient noise and/or ambient light that is measure by the presenter device. Additionally, while only one participant device has an ambient light icon, any number of ambient light icons may be used. The use of ambient noise icons and/or ambient light icons may be dependent on the participant device being capable of measuring ambient noise or ambient light. The ambient noise icons and ambient light icons may be indicated through colors, numeric indications, or shapes of the respective icons.

Figure 2:
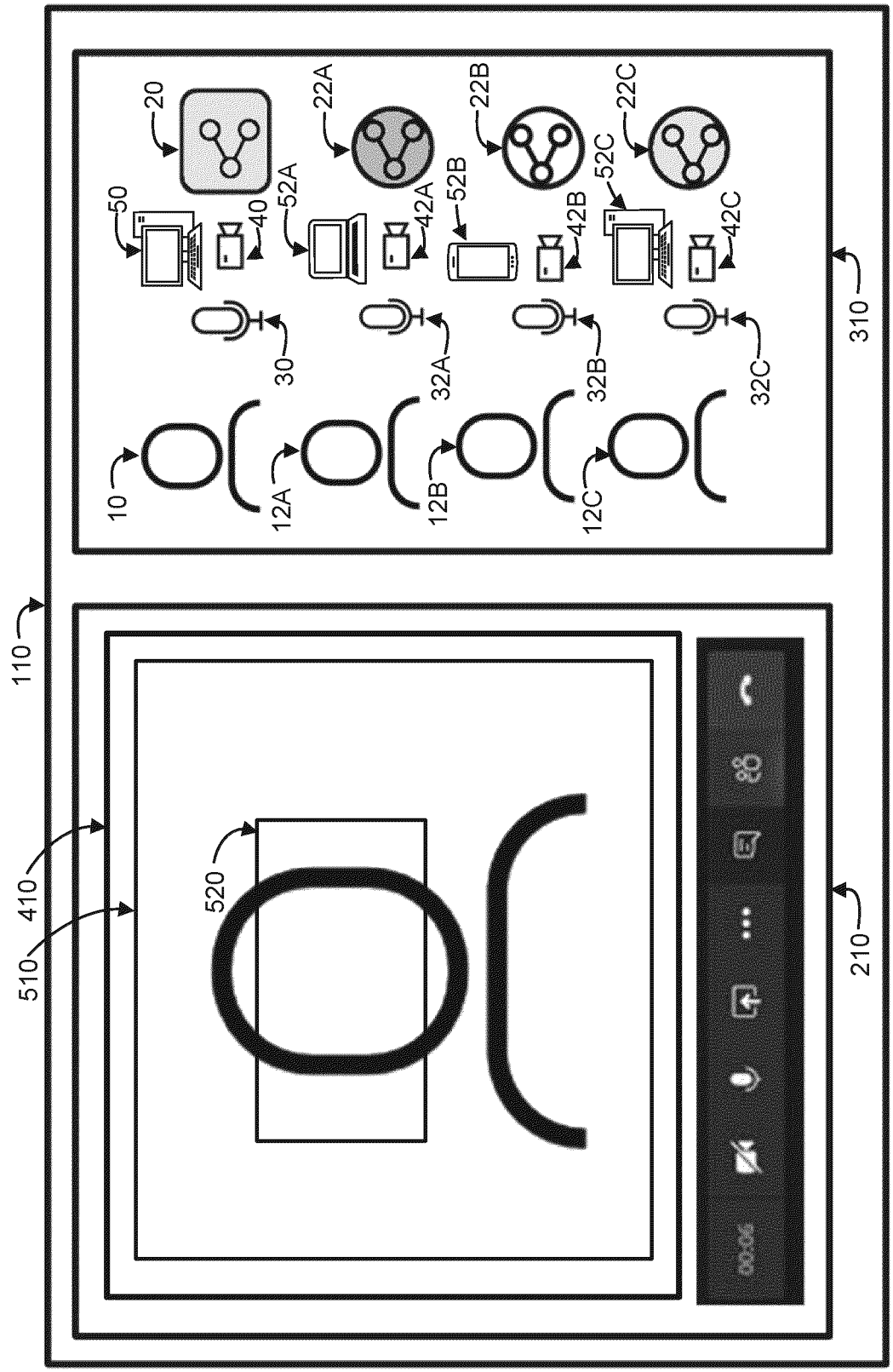
FIG. 2 illustrates another window that may be displayed by an online meeting application on a display device of an electronic device during an online meeting according to some embodiments of the present disclosure.

It should be understood that while FIG. 1 and FIG. 2 show two sub-windows, any number of sub-windows may be used and the information displayed on the two sub-windows may be displayed on one sub-window or separately displayed on any number of sub-windows.

FIG. 2 illustrates another window 110 that may be displayed by an online meeting application on a display device of an electronic device during an online meeting according to some embodiments. In some embodiments, the window 110 is displayed by an electronic device which is operating as a presenter device (i.e. operating in a presenter mode) and includes a first sub-window 210 and a second sub-window 310. The first sub-window 210 includes a share window 410 that can display a video stream component that is being streamed from the presenter device to participant devices of the online meeting.

In the example of FIG. 2 the presenter device is sharing a presentation video stream with participant devices. While each participant device is receiving the presentation video stream, each participant device determines a minimum viewable feature size that a user of the participant device is expected to be able to view on a display device displaying the presentation video stream. This determined minimum viewable feature size can be transmitted to the presenter device and a graphical indication of the minimum viewable feature size may be displayed as an overlay on information that is displayed by a display device of the electronic device.

In FIG. 2, a graphical indication of a first minimum viewable feature size 510, which may be received from a first participant device, is displayed as an overlay on the presentation video stream that is being played out on the share window 410 of the first sub-window 210. A graphical indication of a second minimum viewable feature size 520, which may be received from a second participant device, is also displayed as an overlay on the presentation video stream that is being played out on the share window 410. In this example, the graphical indication of the first minimum viewable feature size 510 may be proportional to the minimum viewable feature size received from a participant device corresponding to the participant icon 12A who is using a laptop computer as indicated by participant device icon 52A. The display device for the participant device laptop may have a smaller screen than the desktop used for the presenter device for the presenter icon 10. As a result of having a smaller screen the displayed graphical objects would be viewed as smaller than a participant who is viewing the presentation video stream on a larger display device and, consequentially, a user of the laptop computer may desire for the presenter to zoom-in on the share window 410 to be able to more accurately or comfortably view the presentation video stream. The second minimum viewable feature size 520 on the other hand may be proportional to the minimum viewable feature size received from a participant device corresponding to the participant icon 12B who is using a smart phone as indicated by participant device icon 52B. The smart phone's display device may be much smaller than the presenter device's display device so there may be a greater need for the presenter to zoom-in on the share window 410 in order for the user of the smart phone to be able to more accurately or comfortably view the presentation video stream.

In some embodiments, the zooming-in on what area of the presentation video stream is streamed (e.g., crop the video frames to the zoomed-in area) to the participant devices, may be performed automatically by the presenter device responsive to the minimum viewable feature sizes received from the participant devices. For example, the presenter device may compare the relative minimum viewable feature sizes received from the participant devices, and determine therefrom an area of the presentation video stream that will be streamed (e.g., crop the video frames to the zoomed-in area) to the participant devices.

Alternatively or additionally, the zooming-in may be performed by the presenter device responsive to receiving command input from a presenter user to zoom-in to an area of the video frames that is to be streamed to the participant devices. The presenter user can intuitively determine how much zoom-in is desired based on viewing the displayed graphical indications of the minimum viewable feature sizes of the participant devices.

In some embodiments, the presenter device displays a single graphical indication of a minimum viewable feature size that corresponds to the smallest of the minimum viewable feature sizes that is received by the presenter device from the participant devices. For example in the example of FIG. 2, where the participant devices include a laptop computer, a smart phone, and a desktop computer, the graphical indication of the minimum viewable feature size corresponding to the smart phone (which has the smallest display device) would be displayed as an overlay on information (ex: the presentation video stream on the share window 410). In this manner, the size of the graphical indication may be controlled to be proportional to the smallest minimum viewable feature size among the minimum viewable feature sizes indicated by the presentation quality metrics received from the participant devices.

Additionally, it should be understood that the graphical indications of the minimum viewable feature sizes 510 and/or 520 may be displayed in other ways than shown in FIG. 2. Moreover, the graphical indications of the minimum viewable feature sizes may be included by the presenter device in the presentation video stream sent to the participant devices.

Figure 6:
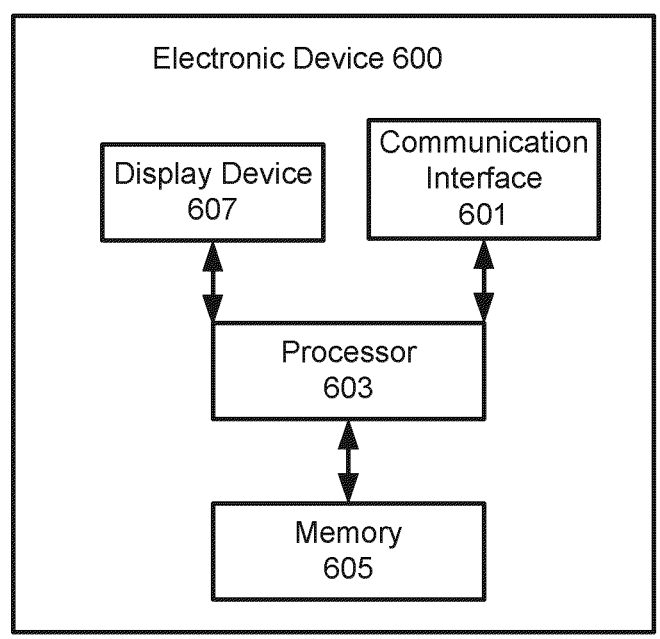
FIG. 6 is a block diagram illustrating components of an electronic device configured according to some embodiments.

FIG. 6 is a block diagram illustrating components of an electronic device 600 configured according to some embodiments. The electronic device 600 may therefore operate as a presenter device or a participant device. As explained above, when the electronic device 600 is streaming video and/or audio to other electronic devices, the electronic device 600 is operating in a presenter mode (i.e. is a presenter device). When the electronic device 600 is receiving streaming video and/or audio from another electronic device, the electronic device 600 is operating in a participant mode (i.e. is a participant device). The electronic device 600 may switch modes based on, for example, user input and/or commands receiving from one or more other electronic devices.

The electronic device 600 includes a communication interface 601, at least one processor circuitry 603 ("processor" for brevity) connected to a display device 607 and to the communication interface 601, and at least one memory 605 ("memory" for brevity) storing online meeting application program code executable by the processor 603 to perform the operations disclosed herein. The display device 607 may be included within the electronic device 600 or may be separate from but communicatively connected to the electronic device 600.

Figure 3:
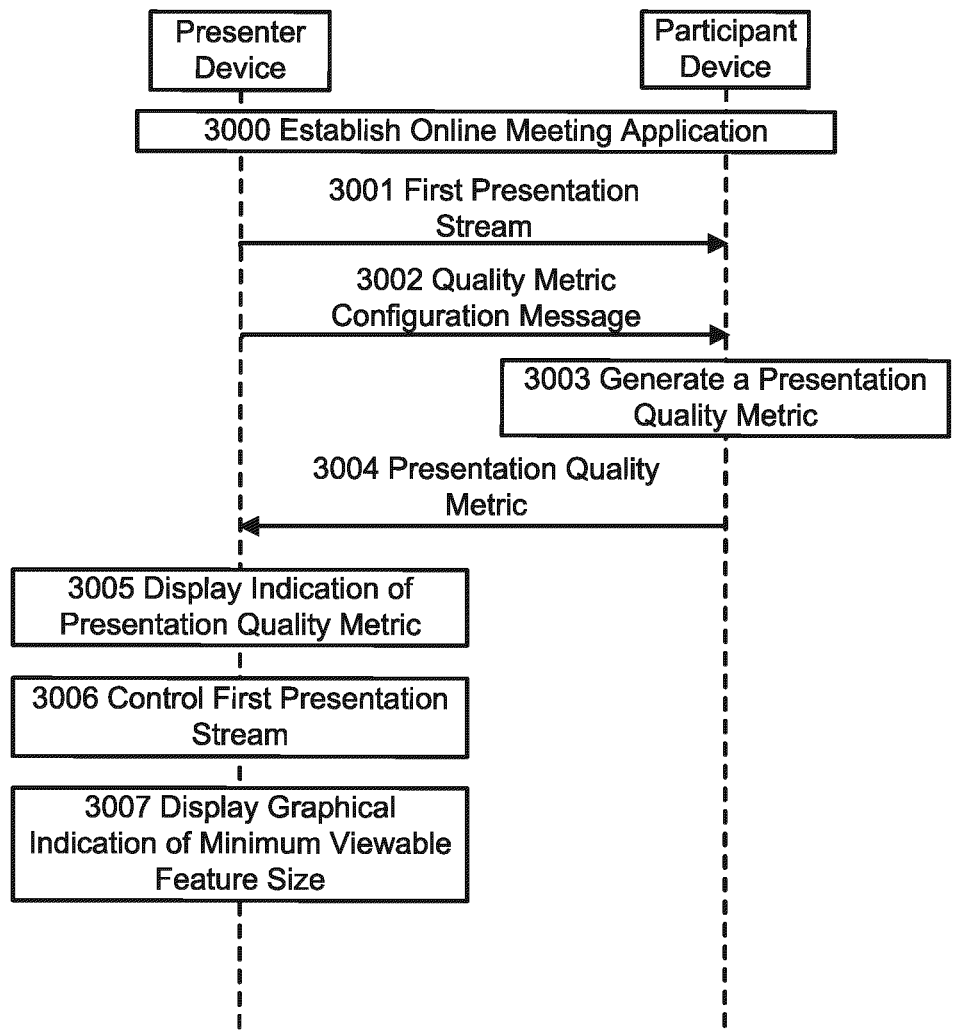
FIG. 3 is a flow diagram illustrating operations performed by a presenter device and a participant device according to some embodiments of the present disclosure.

FIG. 3 is a flow diagram illustrating operations performed by a presenter device and a participant device according to some embodiments. While only one participant device is shown and discussed below for brevity, it should be understood that any number of participant devices may be included in an online meeting and perform the same or similar operations as the participant device explained herein. Additionally, it should be understood that operations 3002, 3003, 3006, and 3007 may be optional.

In the embodiment of FIG. 3, the electronic device 600 may be the presenter device, such that the electronic device 600 is operative in a presenter mode.

According to some embodiments, at operation 3000 the online meeting application establishes an online meeting having a streaming connection to the participant device. The online meeting application allows for video and/or audio to be streamed from the presenter device to the participation device.

In some embodiments at operation 3001, the processor circuitry 603 of the presenter device sends (through communication interface 601) a first presentation steam to the participant device. The first presentation stream can include a video stream component and/or an audio stream component.

In some embodiments at operation 3002, the processor circuitry 603 of the participant device transmits (through communication interface 601) a quality metric configuration message to the participant device. The quality metric configuration message may include metric parameters used by a mathematical operation to be performed by the participant device on the first presentation stream to calculate a presentation quality metric. The presentation quality metric may indicate how the first presentation stream is played out through the participant device.

The presentation quality metric may include or indicate at least one of: when the participant device begins displaying the video stream component; an image, character(s), or other representation that shows the likeness or name of a user that is using the participant device; a connection between the participant device and the presenter device (i.e., electronic device 600); a level of connection between the participant device and the presenter device (i.e., electronic device 600); a level of quality of service of connection to a network; whether the participant device has muted a participant device microphone; whether an on-board speaker of the participant device is presently used for playout of an audio stream component of the first presentation stream; whether a separate speaker connected to the participant device is presently used for playout of an audio stream component of the first presentation stream; whether a headset connected to the participant device is presently used for playout of an audio stream component of the first presentation stream; whether a noise cancellation headset connected to the participant device is presently used for playout of an audio stream component of the first presentation stream; an audio level that the participant device is playing the transmitted audio at; whether a display device is presently used by a participant device to playout a video stream component of the first presentation stream; whether the video has been stopped by the participant device; a time lag between sending of a video frame of the presentation stream by the presenter device (i.e., electronic device 600) to display of the video frame by the participant device on a display device; a quality of video being played out of a display device of the presenter device (i.e., electronic device 600); screen size of a display device used by the participant device to playout the video stream component; screen resolution of a display device used by the participant device to playout the video stream component; type of the participant device from a list of types that includes at least two of a smart phone, a laptop computer, a desktop computer, and a vehicle entertainment system; an ambient noise level measured by the participant device; a presence of ambient noise; an ambient light level measured by the participant device; a presence of ambient light; and a minimum viewable feature size that a user of the participant device is expected to be able to view on a display device associated with the participant device.

The quality metric configuration message may indicate at least one of: a rate at which presentation quality metrics are to be computed and sent by the participant device to the presenter device (i.e., electronic device 600); a quality threshold reporting rule that is to be satisfied to trigger computing and sending of presentation quality metrics by the participant device to the presenter device (i.e., electronic device 600); a number of video frames of a video stream component of the presentation stream that are to be used by the participant device to generate the presentation quality metric sent to the presenter device (i.e., electronic device 600); and a time segment of the presentation stream that is to be used by the participant device to generate the presentation quality metric sent to the presenter device (i.e., electronic device 600).

In some embodiments at operation 3003, the participant device may generate a presentation quality metric indicating how the first presentation stream is played out through the participant device. The participant device may perform a mathematical operation to generate the presentation quality metric using the metric parameters that were transmitted to the participant device from the electronic device 600.

The metric parameters used by the mathematical operation control computations by at least one of: a checksum calculation; a hash value calculation; a full reference calculation indicating a quality difference between the first presentation stream transmitted by the electronic device and the first presentation stream as received by the participant device; a reduced reference calculation indicating a quality difference between a subset of features within the first presentation stream transmitted by the electronic device and that subset of features within the first presentation stream as received by the participant device; and a no-reference calculation indicating quality of the first presentation stream as received by the participant device without a comparison to the first presentation stream transmitted by the electronic device.

The no-reference calculation may be performed based on at least one of: a number of pixels in video frames of a video stream component of the first presentation stream as received by the participant device; a frame rate of the video frames; and a combination of the number of pixels and the frame rate.

In some embodiments at operation 3004, after the participant device generates a presentation quality metric, the participant device sends the presentation quality metric to the electronic device 600, and the processor circuitry 603 of the electronic device 600 receives (through communication interface 601) the presentation quality metric.

In some embodiments at operation 3005, the processor circuitry 603 of the electronic device 600 may display an indication of the presentation quality metric on a display device 607 for review by a user of the electronic device 600. These indications may be displayed on the display device 607 as illustrated and discussed with regards to FIGS. 1 and 2, and/or may display other information that provides an indication of the presentation quality metric for review by a user of the electronic device 600.

In some embodiments at operation 3006, the processor circuitry 603 of the electronic device 600 may control contrast in video frames of the presentation video stream component and/or a level of magnification of an area within the video frames sent by the electronic device 600 responsive to the indication of the ambient light level sensed by the participant device. For example, if the participant device indicates through the presentation quality metric that the participant device sensed an ambient light level that satisfies a defined rule, e.g., greater than a defined threshold, then the electronic device 600 may increase contrast in video frames of the presentation video stream component in order for the user of the participant device to better view features in the presentation video stream component.

In some embodiments at operation 3007, the processor circuitry 603 of the electronic device 600 may display a graphical indication of the minimum viewable feature size as overlay on information that is displayed by the electronic device 600 on a display device 607. The information may be included by the electronic device 600 in the first presentation stream sent to the participant devices. The size of the graphical indication may be proportional to the minimum viewable feature size.

In some embodiments, the processor circuitry 603 may control the size of the graphical indication proportional to a smallest minimum viewable feature size among the minimum viewable feature sizes indicated by the presentation quality metrics received from the participant devices.

Figure 4:
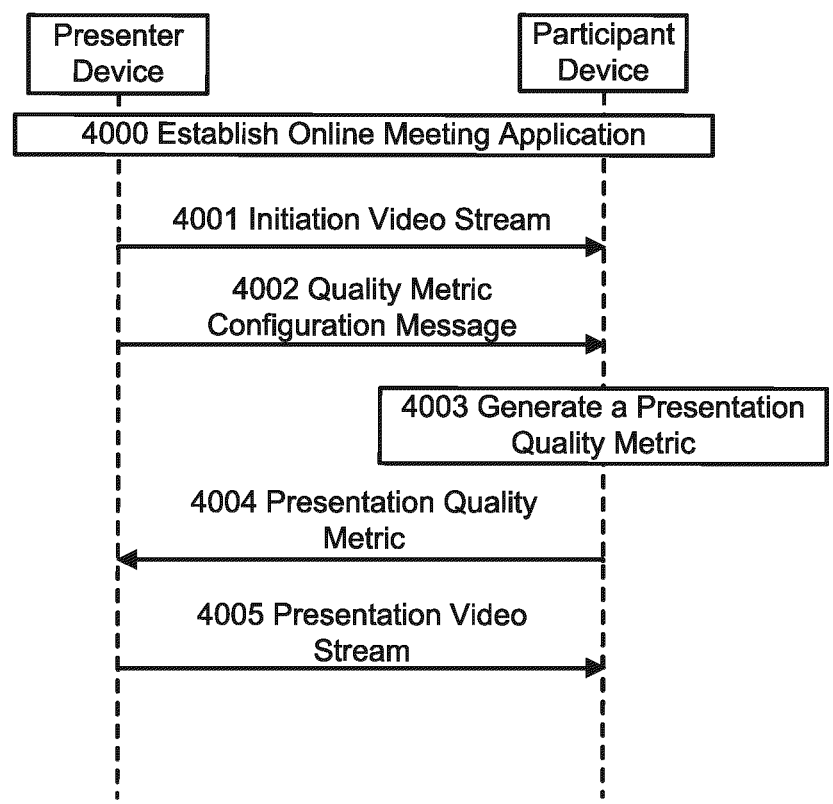
FIG. 4 is a flow diagram illustrating operations of an electronic device according to some embodiments of the present disclosure.

FIG. 4 is a flow diagram illustrating operations of an electronic device 600 according to some embodiments. In this embodiment, the electronic device 600 may be the presenter device, such when the electronic device 600 is operative in a presenter mode.

In this embodiment, the first presentation stream (of FIG. 3) comprises a presentation video stream component. At operation 4000, the processor circuitry 603 of the electronic device 600 executes an online meeting application to establish an online meeting with a streaming connection to a participant device. The online meeting application allows for video and/or audio to be streamed from the presenter device to the participation device. Optionally, operation 4000 may be performed similar to operation 3000 of FIG. 3.

In some embodiments at operation 4001, the processor circuitry 603 of the presenter device sends (though communication interface 601) an initiation video stream to the participant device.

The initiation video stream may be a blank video stream (e.g., a solid color) or a pattern, a logo, a first frame of a presentation video stream, or another non-blank video stream that is to be used to allow for the participant device to generate a presentation quality metric therefrom.

In some embodiments at operation 4002, the processor circuitry 603 of the presenter device may transmit (though communication interface 601) a quality metric configuration message. Optionally, operation 4002 may be performed similar to operation 3002 of FIG. 3.

In some embodiments at operation 4003, the participant device may generate a presentation quality metric. Optionally, operation 4003 may be performed similar to operation 3003 of FIG. 3.

In some embodiments at operation 4004, after the participant device generates a presentation quality metric, the participant device may send the presentation quality metric to the presenter device for receipt (through communication interface 601). Optionally, operation 4004 may be performed similar to operation 4004 of FIG. 4.

In some embodiments at operation 4005, the processor circuitry 603 of the presenter device may switch from sending the initiation video stream to sending the presentation video stream component based on the presentation quality metrics received from the participant devices indicating at least one of: a threshold percentage of the participant devices have begun displaying the initiation video stream; a threshold percentage of the participant devices relative to a total number of registered attendees for the online meeting have begun displaying the initiation video stream; and a threshold percentage of the participant devices have provided presentation quality metrics satisfying a threshold presentation quality metric while displaying the initiation video stream.

The registered attendees may be devices or users that are registered, or invited to register, to join the online meeting.

Figure 5:
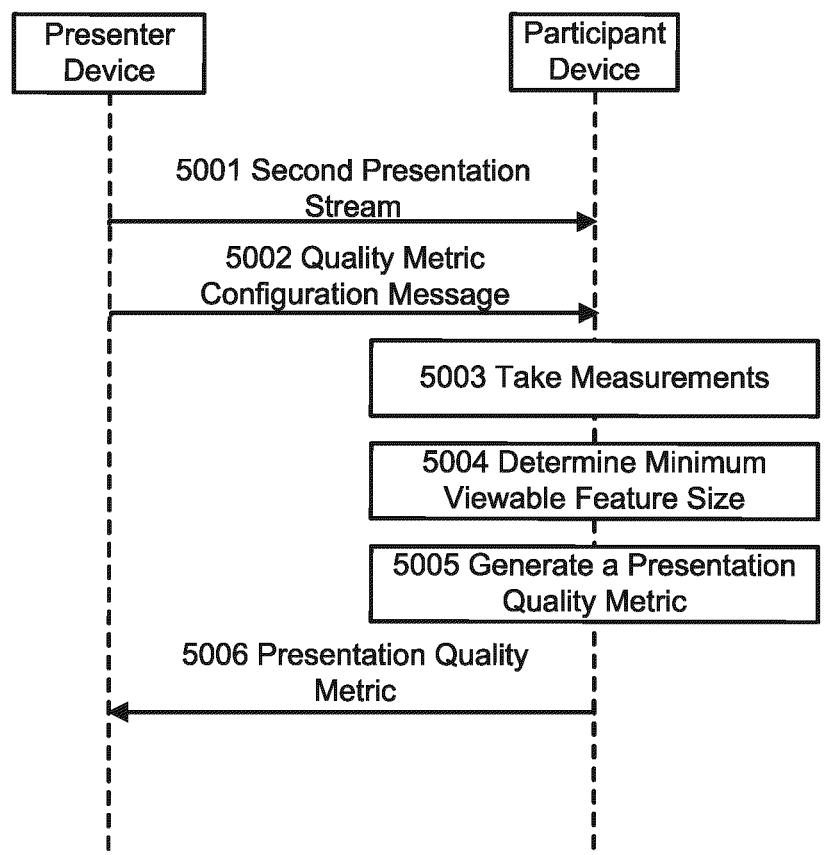
FIG. 5 is a flow diagram illustrating operations of an electronic device operative in a participant mode according to some embodiments of the present disclosure.

FIG. 5 is a flow diagram illustrating operations of an electronic device 600 operative in a participant mode according to some embodiments.

In an example of FIG. 5, during an ongoing online meeting the electronic device 600 switches from operating in the presenter mode to now operating in a participant mode. For example, during a video conference while the electronic device is sharing its screen with a group of participant devices, a user may turn off screen-sharing to transition the electronic device to a participant mode and then the electronic device can start receiving video from another electronic device that is now operating in presentation mode. The other electronic device that begins sending its video stream or other presentation stream is referred to as a presenter electronic device.

It should be understood that operations 5002, 5003, and 5004 may be optional.

At operation 5001, the electronic device 600 that is acting as a participant device (i.e., operating in a participant mode) may receive (though communication interface 601) a second presentation stream from a presenter electronic device.

In some embodiments at operation 5002, the electronic device 600 may receive (through communication interface 601) a quality metric configuration message from the presenter electronic device indicating at least one of: a rate at which presentation quality metrics are to be computed and sent by the electronic device to the presenter electronic device; and a quality threshold reporting rule that is to be satisfied to trigger computing and sending of presentation quality metrics by the electronic device to the presenter electronic device.

Alternatively or additionally, at operation 5002, the electronic device 600 may receive (through communication interface 601) a quality metric configuration message from the presenter electronic device indicating at least one of: a number of video frames of a video stream component of the second presentation stream that are to be used by the electronic device to generate the presentation quality metric sent to the presenter electronic device; and a time segment of the second presentation stream that is to be used by the electronic device to generate the presentation quality metric sent to the presenter electronic device.

In some embodiments at operation 5003, the electronic device 600 may measure at least one of an ambient noise level and an ambient light level. The electronic device 600 may measure the ambient noise level from a microphone that is in communication with the processor circuitry 603. The electronic device 600 may measure the ambient light level from a camera or light sensor that is in communication with the processor circuitry 603.

In some embodiments at operation 5004, the electronic device 600 may determine a minimum viewable feature size that a user of the electronic device is expected to be able to view on a display device displaying the second presentation stream.

In some embodiments at operation 5005, the electronic device 600 may generate a presentation quality metric indicating how the second presentation stream is played out through the electronic device. The electronic device may generate the presentation quality metric similar to how the participant device of FIG. 3 generated the presentation quality metric.

Additionally or alternatively, the electronic device 600 may include an indication of the measurement of the at least one of the ambient noise level and ambient light level in the presentation quality metric sent to the presenter electronic device.

Additionally or alternatively, the electronic device 600 may include the minimum viewable feature size in the presentation quality metric sent to the presenter electronic device.

In some embodiments at operation 5006, the electronic device 600 may send the presentation quality metric generated by the electronic device to the presenter electronic device.

Further Definitions and Embodiments

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the appended examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the following examples of embodiments and their equivalents, and shall not be restricted or limited by the foregoing detailed description.

What is claimed is:

1. A method performed by an online meeting application executed by an electronic device, the method comprising:
during an ongoing online meeting while the electronic device is operative in a presenter mode sending a first presentation stream to participant devices,
receiving a presentation quality metric from each of the participant devices, wherein the presentation quality metric indicates how the first presentation stream is played out through the participant device, and
displaying an indication of the presentation quality metric on a display device for review by a user of the electronic device;
wherein the first presentation stream comprises a presentation video stream, and wherein the presentation quality metric indicates a minimum viewable feature size that a user of the participant device is expected to be able to view on a display device associated with the participant device; and further comprising:
displaying a graphical indication of the minimum viewable feature size as an overlay on information that is displayed by the electronic device on a display device, wherein the information is included by the electronic device in the first presentation stream sent to the participant devices, wherein size of the graphical indication is proportional to the minimum viewable feature size.

2. The method of claim 1, wherein the first presentation stream comprises a video stream component, and the presentation quality metric indicates when the participant device begins displaying the video stream component.

3. The method of claim 1, wherein the method further comprises:
during the ongoing online meeting, transmitting a quality metric configuration message to the participant device, wherein the quality metric configuration message includes metric parameters used by a mathematical operation to be performed by the participant device on the first presentation stream to calculate the presentation quality metric.

4. The method of claim 3, wherein the metric parameters used by the mathematical operation control computations by at least one of: a checksum calculation; a hash value calculation; a full reference calculation indicating a quality difference between the first presentation stream transmitted by the electronic device and the first presentation stream as received by the participant device; a reduced reference calculation indicating a quality difference between a subset of features within the first presentation stream transmitted by the electronic device and that subset of features within the first presentation stream as received by the participant device; and a no-reference calculation indicating quality of the first presentation stream as received by the participant device without a comparison to the first presentation stream transmitted by the electronic device.

5. The method of claim 4, wherein the metric parameters used by the mathematical operation control operation of the no-reference calculation, and wherein the no-reference calculation is performed based on at least one of: a number of pixels in video frames of a video stream component of the first presentation stream as received by the participant device; a frame rate of the video frames; and a combination of the number of pixels and the frame rate.

6. The method of claim 1, wherein the presentation quality metric indicates at least one of: whether a display device is presently used by the participant device to playout a video stream component of the first presentation stream; whether an on-board speaker of the participant device is presently used for playout of an audio stream component of the first presentation stream; whether a separate speaker connected to the participant device is presently used for playout of an audio stream component of the first presentation stream; whether a headset connected to the participant device is presently used for playout of an audio stream component of the first presentation stream; and whether a noise cancellation headset connected to the participant device is presently used for playout of an audio stream component of the first presentation stream.

7. The method of claim 1, wherein the first presentation stream comprises a video stream component, and wherein the presentation quality metric indicates at least one of: screen size of a display device used by the participant device to playout the video stream component; screen resolution of a display device used by the participant device to playout the video stream component; and type of the participant device from a list of types that includes at least two of a smart phone, a table computer, a laptop computer, a desktop computer, and a vehicle entertainment system.

8. The method of claim 1, wherein the first presentation stream comprises a presentation video stream component, and the method further comprises:
sending an initiation video stream to the participant devices;
switching from sending the initiation video steam to sending the presentation video stream component based on the presentation quality metrics received from the participant devices indicating at least one of: a threshold percentage of the participant devices have begun displaying the initiation video stream; a threshold percentage of the participant devices relative to a total number of registered attendees for the online meeting have begun displaying the initiation video stream; and a threshold percentage of the participant devices have provided presentation quality metrics satisfying a threshold presentation quality metric while displaying the initiation video stream.

9. The method of claim 1, wherein the first presentation stream comprises a video stream component, and wherein the presentation quality metric indicates a time lag between sending of a video frame of the presentation video stream by the electronic device to display of the video frame by the participant device on a display device.

10. The method of claim 1, wherein the presentation quality metric indicates an ambient noise level measured by the participant device and/or an ambient light level measured by the participant device.

11. The method of claim 10, wherein the information included in the presentation quality metric indicates the ambient light level sensed by the participant device, and further comprising:
controlling contrast in video frames of the presentation video stream component and/or a level of magnification of an area within the video frames sent by the electronic device responsive to the indication of the ambient light level sensed by the participant device.

12. The method of claim 1, wherein the size of the graphical indication is controlled proportional to a smallest minimum viewable feature size among the minimum viewable feature sizes indicated by the presentation quality metrics received from the participant devices.

13. The method of claim 1, further comprising:
during the ongoing online meeting while the electronic device is operative in a participant mode receiving a second presentation stream from a presenter electronic device,
generating a presentation quality metric indicating how the second presentation stream is played out through the electronic device, and
sending the presentation quality metric generated by the electronic device to the presenter electronic device.

14. The method of claim 13, further comprising:
receiving a quality metric configuration message from the presenter electronic device indicating at least one of: a rate at which presentation quality metrics are to be computed and sent by the electronic device to the presenter electronic device; and a quality threshold reporting rule that is to be satisfied to trigger computing and sending of presentation quality metrics by the electronic device to the presenter electronic device.

15. The method of claim 13, further comprising:
receiving a quality metric configuration message from the presenter electronic device indicating at least one of: a number of video frames of a video stream component of the second presentation stream that are to be used by the electronic device to generate the presentation quality metric sent to the presenter electronic device; and a time segment of the second presentation stream that is to be used by the electronic device to generate the presentation quality metric sent to the presenter electronic device.

16. The method of claim 13, further comprising:

measuring at least one of an ambient noise level and an ambient light level; and including an indication of the measurement of the at least one of the ambient noise level and the ambient light level in the presentation quality metric sent to the presenter electronic device.

17. The method of claim 13, further comprising:

determining a minimum viewable feature size that a user of the electronic device is expected to be able to view on a display device displaying the second presentation stream, and including the minimum viewable feature size in the presentation quality metric sent to the presenter electronic device.

18. An electronic device comprising:

a communication interface;

at least one processor connected to a display device and to the communication interface; and at least one memory comprising online meeting application program code executable by the at least one processor to:

during an ongoing online meeting while the electronic device is operative as a first presenter device that is sending a first presentation stream through the communication interface to participant devices, receive a presentation quality metric from the participant devices, wherein the presentation quality metric indicates how the first presentation stream is played out through the participant device, and display an indication of the presentation quality metric on the display device for review by a user of the electronic device;

wherein the first presentation stream comprises a presentation video stream, and wherein the presentation quality metric indicates a minimum viewable feature size that a user of the participant device is expected to be able to view on a display device associated with the participant device; and further comprising:

display a graphical indication of the minimum viewable feature size as an overlay on information that is displayed by the electronic device on a display device, wherein the information is included by the electronic device in the first presentation stream sent to the participant devices, wherein size of the graphical indication is proportional to the minimum viewable feature size.

* * * * *